April 19, 1955     D. W. KELBEL     2,706,419
TRANSMISSION

Filed March 16, 1951     6 Sheets-Sheet 1

Inventor:
Donald W. Kelbel

April 19, 1955     D. W. KELBEL     2,706,419
TRANSMISSION

Filed March 16, 1951     6 Sheets-Sheet 2

Inventor:
Donald W. Kelbel

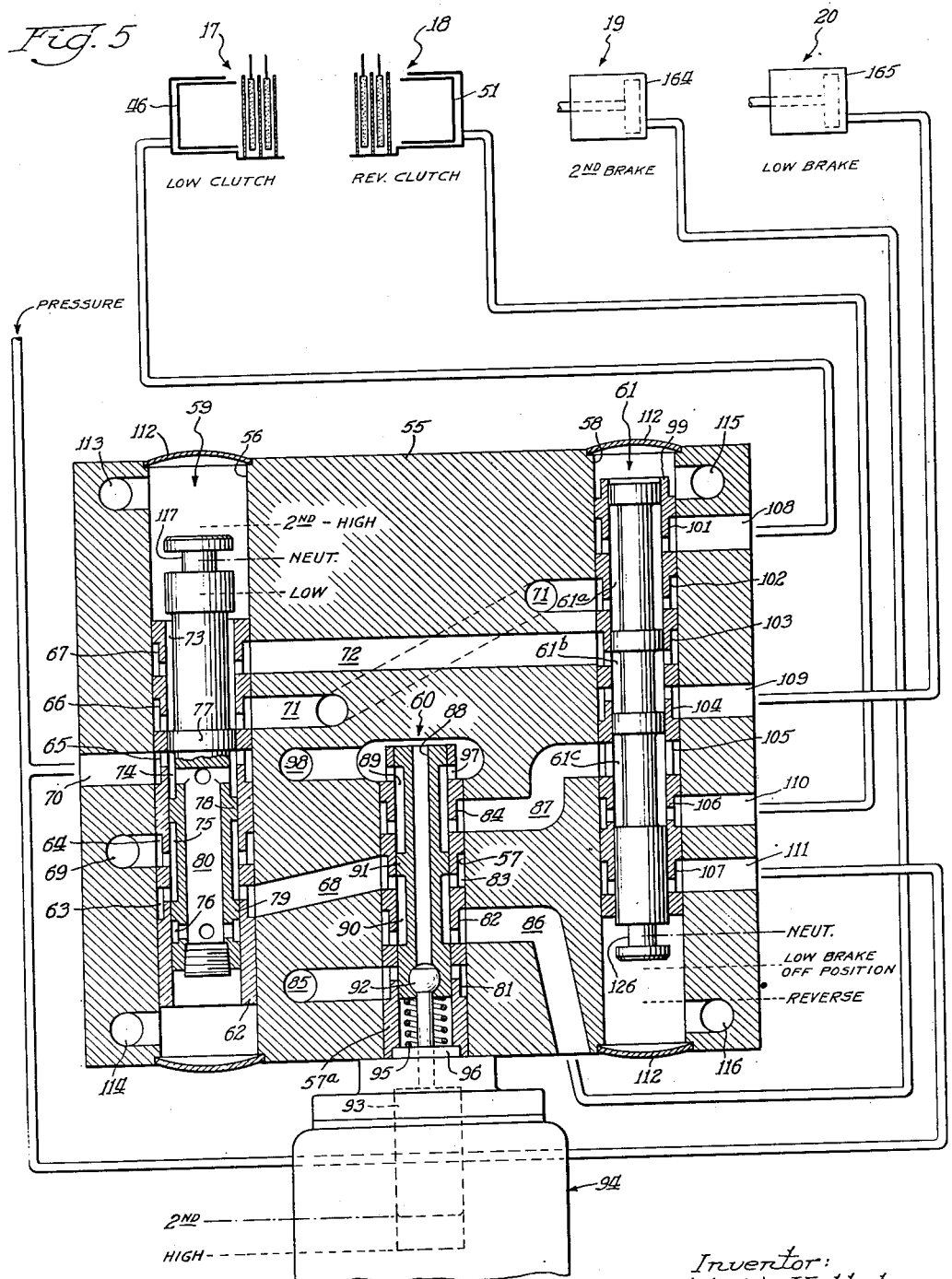

April 19, 1955   D. W. KELBEL   2,706,419
TRANSMISSION
Filed March 16, 1951   6 Sheets-Sheet 4
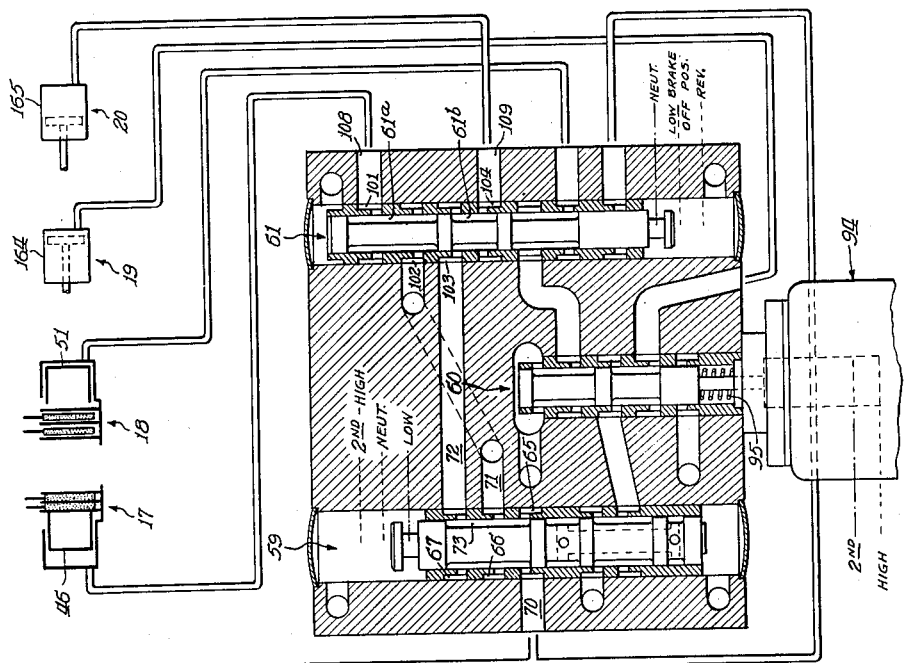
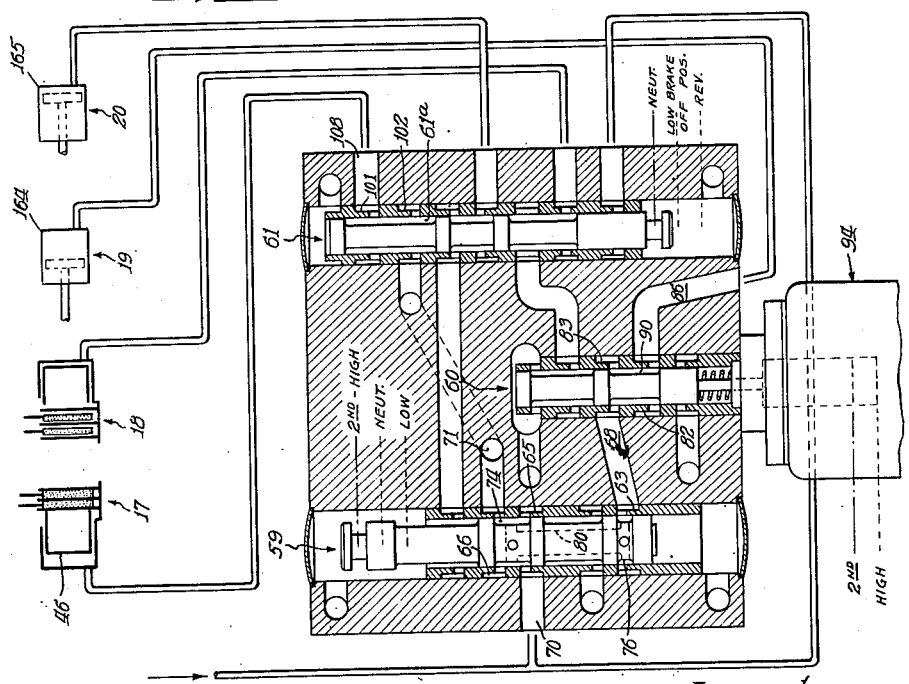
Inventor:
Donald W. Kelbel
By Edward O. Fitzgerald
Atty.

April 19, 1955    D. W. KELBEL    2,706,419
TRANSMISSION
Filed March 16, 1951    6 Sheets-Sheet 5
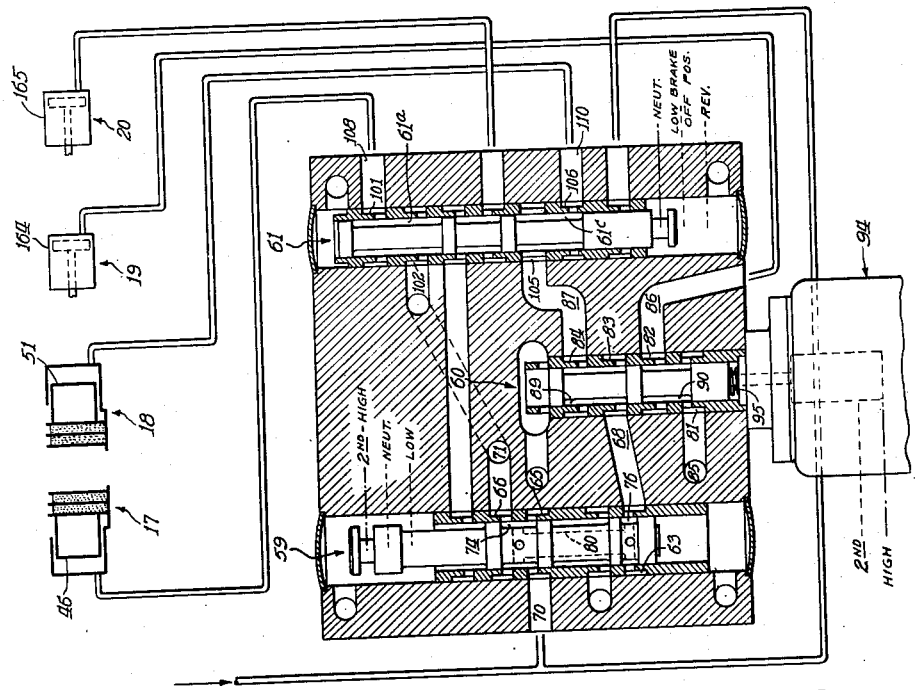
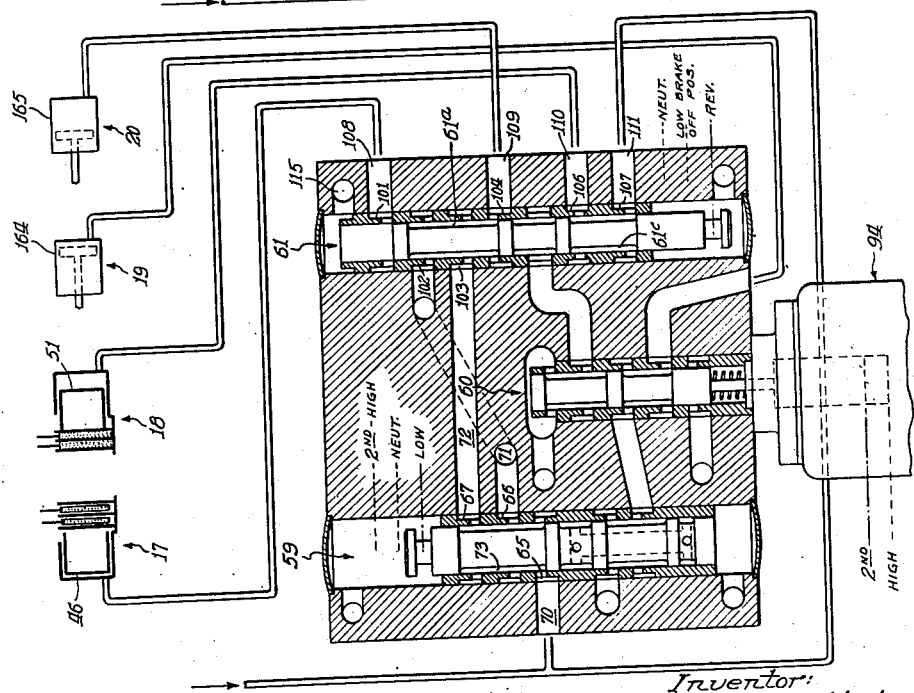
Inventor:
Donald W. Kelbel
By Edward C. Fitzhugh
Atty.

April 19, 1955     D. W. KELBEL     2,706,419
TRANSMISSION
Filed March 16, 1951     6 Sheets-Sheet 6
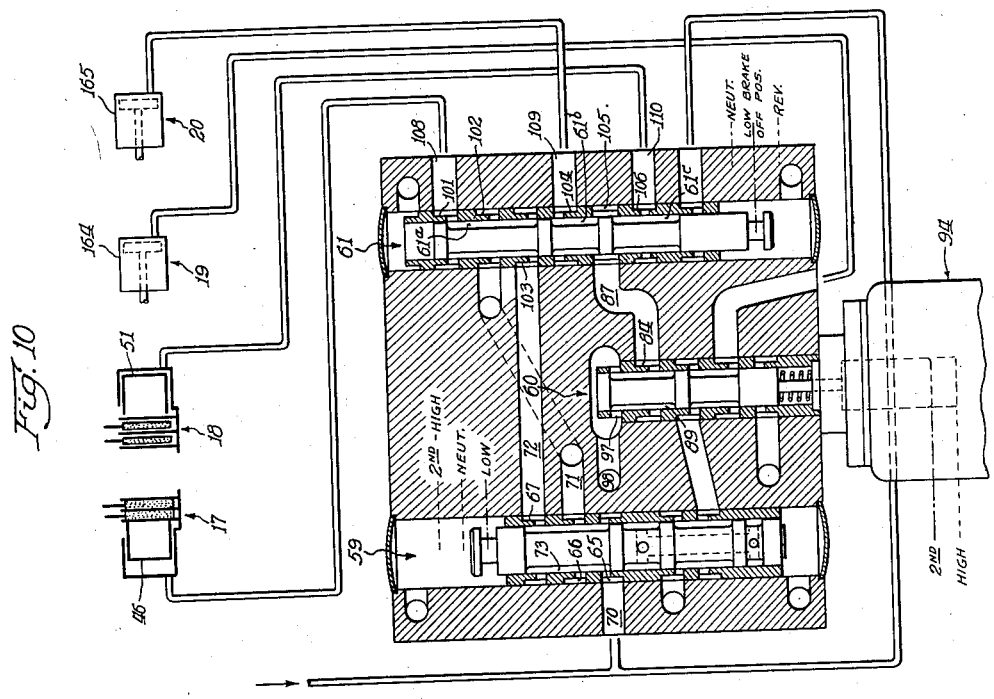
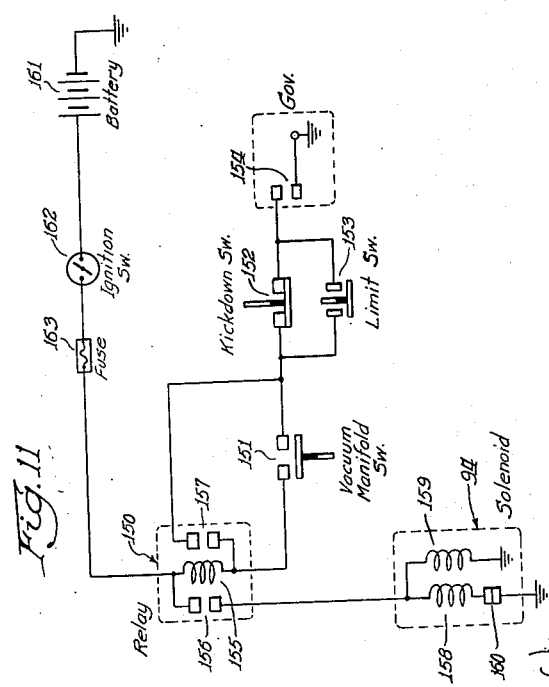
Inventor:
Donald W. Kelbel

United States Patent Office 2,706,419
Patented Apr. 19, 1955

2,706,419

TRANSMISSION

Donald W. Kelbel, Muncie, Ind., assignor to Borg-Warner Corporation, Chicago, Ill., a corporation of Illinois Application March 16, 1951, Serial No. 216,067

20 Claims. (Cl. 74—763)

The present invention relates to transmissions generally and more particularly to transmissions for automotive vehicles.

The principal object of the present invention is to provide a transmission of the type employing a reaction element which is held stationary during one of the drives through the transmission by means of two brakes, one of which becomes locked to the reaction element due to the reaction thereon during the drive, wherein means are provided for temporarily disengaging the other brake and changing the direction of reaction on the reaction element so that the one brake may then be easily disengaged from the reaction element in order to completely break the drive through the transmission.

In automotive vehicle transmissions utilizing planetary gearing for effecting the different drives through the transmission, it is quite well-known to utilize one of the elements of the gearing as a stationary reaction element to complete the reduced speed and reverse drives through the transmission. In such case, due to the reduction particularly in reverse drive, the reaction on the reaction element is considerable and to avoid wearing out the friction brake, normally utilized for braking the reaction element during the reduced speed forward drive, during reverse drive when the reaction is in the opposite direction, a positive brake comprising a reciprocable pawl and teeth on the periphery of the reaction element is generally employed. During the reverse drive the reaction is such that the pawl and the teeth become locked and it is then very difficult to disengage them. Since the friction brake is also engaged during reverse drive, it holds the positive brake in its locked condition. It is desirable to employ a manual drive selecting means which is reciprocable between a reverse and a low forward drive position and since the friction brake is also engaged in the low forward position, the reaction element is held in the position wherein the positive brake is locked, during the shift from reverse to low. As a result it is very difficult to withdraw the pawl from the reaction member upon the shift from reverse to low. The present invention provides means for disengaging the friction brake temporarily during the change from reverse to low forward drive and simultaneously engaging a clutch whereby the reaction on the reaction element is reversed so as to free the positive brake from its engagement with the reaction element. Thereafter the drive changing means can be moved to its low forward position to cause complete disengagement of the positive brake from the reaction element and reengagement of the friction brake to establish a low forward drive.

Another object of the present invention is to provide a simple mechanical linkage to the positive brake and to the friction brake control means whereby, upon a change from reverse drive to low forward drive, the control means is first moved to an intermediate position to cause disengagement of the friction brake and engagement of a clutch which in turn changes the direction of reaction on the reaction element to thereby unlock the positive brake, and thereafter, upon completion of the change to low forward drive, the linkage disengages the positive brake and moves the control means to its low forward drive position in which the friction brake is reengaged.

The linkage referred to in connection with the last mentioned object comprises a pair of levers, pivotally connected together which constitute a broken back lever. These two levers also have a bolt and slot connection therebetween. Upon movement of a manually operable selector lever from its reverse drive position to its low forward drive position, the broken back lever first breaks to the limit permitted by the pin and slot, the portion of the broken back lever connected to the positive brake remaining stationary temporarily, and the other portion of the broken back lever moving a friction brake control valve to an intermediate position to cause disengagement of the friction brake and to cause a reversal of reaction on the reaction element to thereby unlock the positive brake. Thereafter, due to the unlocking of the positive brake, the broken back lever straightens and the selector lever may be moved completely to its low forward drive position to cause complete disengagement of the positive brake.

The above and numerous other objects and numerous advantages of the invention will become apparent from the following detailed description, when read in conjunction with the accompanying drawings, wherein:

Fig. 4 is a sectional view through the valve block showing the connection between the control linkage and the control valves;

Fig. 5 is a schematic view of the control valve block showing the position of the valves when the transmission is conditioned for neutral;

Fig. 6 is a schematic view of the control valve block showing the position of the valves when the transmission is conditioned for low forward drive;

Fig. 7 is a schematic view of the control valve block showing the position of the valves when the transmission is conditioned for intermediate or second forward speed drive;

Fig. 8 is a schematic view of the control valve block showing the position of the valves when the transmission is conditioned for high speed forward drive;

Fig. 9 is a schematic view of the control valve block showing the position of the valves when the transmission is conditioned for reverse drive;

Fig. 10 is a schematic view of the control valve block showing the position of the valves during a transition from reverse drive to low forward drive at a time when the low speed forward drive friction brake is disengaged; and Fig. 11 is a schematic wiring diagram showing the electrical circuits utilized in controlling the transmission.

Figure 1:
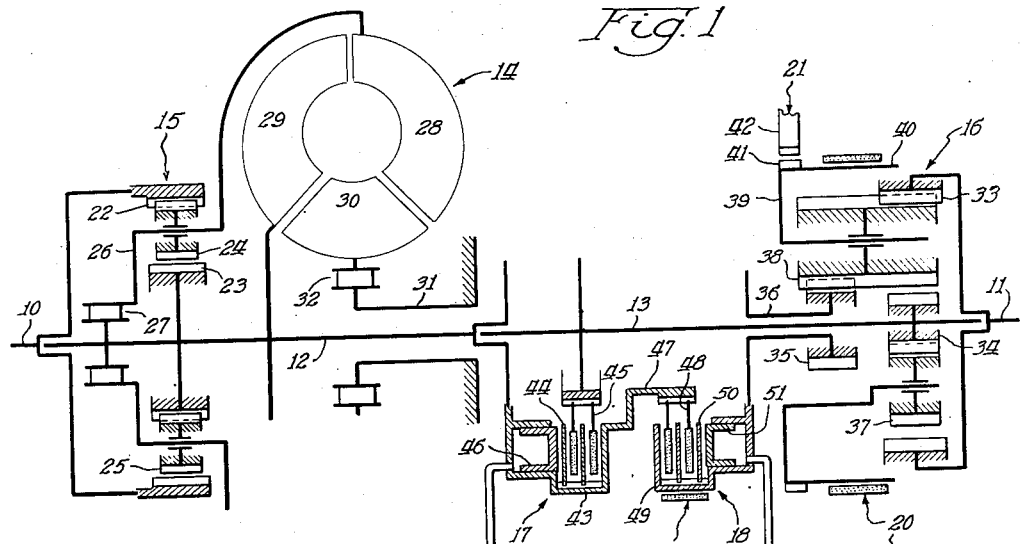
Fig. 1 is a schematic illustration of a transmission of the type with which the present invention may be associated.

With reference to the drawings, wherein like reference numerals in the several views identify identical parts throughout, and with particular reference to Fig. 1, the present transmission includes a drive shaft 10, which itself may be the vehicle engine crankshaft or may be a shaft connected with the engine crankshaft, a tail shaft or driven shaft 11, connected with the driving wheels of the vehicle (not shown), and two intermediate shafts 12 and 13. The transmission also includes a hydraulic torque converter 14, a front planetary gear set 15, a rear planetary gear set 16, a front clutch 17, a rear clutch 18, a front brake 19, a rear brake 20, and a positive brake 21.

The front planetary gear set 15 comprises a ring gear 22 connected directly to the drive shaft 10, a sun gear 23 integrally formed on the intermediate shaft 12, a plurality of planetary pinions 24 which mesh with the ring gear 22, a plurality of planetary pinions 25 which mesh with the sun gear 23 and with the pinions 24, and a planetary pinion carrier 26 for rotatably mounting the pinions 24 and 25. The carrier 26 is connected to the intermediate shaft 12 by means of a one-way clutch 27. The one-way clutch 27 may be of conventional construction, such as the one-way sprag or roller clutches, and functions to permit the carrier 26 to rotate in a forward direction at an overdrive with respect to the intermediate shaft 12, however, the one-way clutch 27 becomes engaged whenever the intermediate shaft 12 tends to rotate at a higher rate of speed than the carrier 26 and in a forward direction so that the intermediate shaft 12 cannot be driven faster than the carrier 26. Due to the fact that the planetary gear set 15 is of the dual pinion type, when the vehicle is started from rest the intermediate shaft 12 is initially stationary and consequently the planetary pinion carrier 26 is driven in a forward direction but at an overdrive with respect to the drive shaft 10. After the speed of the intermediate shaft 12 picks up, the forward speed of rotation of the carrier 26 more nearly approaches that of the drive shaft 10.

The hydraulic torque converter 14 comprises an impeller 28 connected directly with the carrier 26, a driven element or turbine 29 connected directly with the intermediate shaft 12, and a stator or reaction element 30 connected to a stationary sleeve shaft 31 by means of a one-way brake 32. The one-way brake 32 may be of conventional roller or sprag construction and functions to prevent reverse rotation of the stator 30. When the hydraulic torque converter 14 is functioning to convert torque, the stator element 30 tends to rotate reversely but the one-way brake 32 prevents it from doing so and after the speed of the turbine 29 approximates the speed of the impeller 28 the torque converter 14 functions substantially as a fluid coupling, whereupon all of its elements 28, 29 and 30 rotate in a forward direction at substantially the same speed of rotation.

Initially, when the vehicle is starting from rest, the intermediate shaft 12 is substantially stationary and due to the fact that the carrier 26 of the planetary gear set 15 is rotated at an overdrive with respect to the drive shaft 10, the impeller 28 is also rotated at this same overdrive. The turbine 29 will be driven slowly at first, gradually increasing in speed and as the sun gear 23, which is connected directly to the intermediate shaft 12, increases its speed in the forward direction the ratio between the drive shaft 10 and the carrier 26 approaches a one-to-one ratio and when the speed of the intermediate shaft 12 increases to such a point that the turbine 29 and impeller 28 are rotating substantially as a unit, then the sun gear 23 and the ring gear 22 are also rotating at substantially the same speed. Under this condition a substantially direct drive obtains between the shafts 10 and 12, with all of the elements of the planetary gear set 15 and of the hydraulic torque converter 14 rotating in the same direction and at substantially the same speed.

The planetary gear set 16 comprises a ring gear 33 connected directly to the driven shaft 11, a sun gear 34 integrally formed on the intermediate shaft 13, a sun gear 35 integrally formed on a sleeve shaft 36 concentrically mounted around the intermediate shaft 13, a plurality of planetary pinions 37 meshing with the sun gear 34, a plurality of elongated planetary pinions 38 meshing with the sun gear 35, the pinions 37 and the ring gear 33, and a planetary pinion carrier 39 for rotatably mounting the pinions 38 and 37. The pinion carrier 39 is formed integrally with a brake drum 40 which is designed to be engaged by the band of the friction brake 20 in order to hold the carrier 39 against rotation. The drum 40 is also formed with a plurality of teeth 41 around its periphery. The teeth 41 comprise the rotatable element of the positive brake 21. The positive brake 21 also includes a reciprocable pawl 42 which may be moved into and out of engagement with the teeth 41 in order to hold the carrier 39 against rotation during reverse drive.

The friction clutch 17 is provided for interconnecting the intermediate shaft 12 with the intermediate shaft 13 and comprises a drum portion 43 formed integrally on the intermediate shaft 12 and having a pair of pressure plates 44 secured thereto, and a pair of friction discs 45 splined to the intermediate shaft 13. The drum 43 is formed so as to provide a cylinder for receiving a piston 46. When fluid under pressure is admitted behind the piston 46 the discs 45 are compressed between the pressure plates 44 to thereby cause engagement of the clutch 17.

The friction clutch 18 is similar to the friction clutch 17 and is provided for interconnecting the intermediate shaft 12 with the sleeve shaft 36. One element of the clutch 18 comprises a drum portion 47 which is merely an extension of the drum 43, and which has a pair of friction discs 48 splined thereto. The other element of the friction clutch 18 consists of a drum 49 having a pair of pressure plates 50 and formed so as to provide a cylinder for receiving a fluid pressure actuated piston 51. When fluid under pressure is admitted behind the piston 51 the friction discs 48 are compressed against the pressure plates 50 in order to engage the clutch 18 whereupon the sun gear 35 is rotated directly with the intermediate shaft 12.

The drum 49 is also designed to be engaged on its outer periphery by the band of the friction brake 19 and when so engaged, the sun gear 35 is held against rotation.

It is contemplated that a governor will be driven by the driven shaft 11 and also that a pair of fluid pumps will be provided in the present transmission. One of the fluid pumps can be conveniently connected to rotate with the impeller 28 of the hydraulic torque converter 14 as is conventional practice and the other fluid pump may be driven by the driven shaft 11 which is also conventional. The fluid from these pumps may be utilized for actuating the clutches 17 and 18 and the brakes 19 and 20 and may also be utilized for maintaining a supply of fluid in the hydraulic torque converter 14 and for lubricating all the members of the gearing.

The present invention provides three forward speed drives and one reverse drive between the drive shaft 10 and the driven shaft 11. The following table shows which clutches and brakes are engaged and disengaged during the establishment of each of the drives.

| Speeds | Clutches | | Brakes | | |
|---|---|---|---|---|---|
| | 17 | 18 | 19 | 20 | 21 |
| Low | On | Off | Off | On | Out. |
| Second | On | Off | On | Off | Out. |
| High | On | On | Off | Off | Out. |
| Reverse | Off | On | Off | On | In. |

In low forward speed drive it is seen from the above table that the clutch 17 and the brake 20 are engaged. The power train during low forward speed drive then proceeds from the drive shaft 10 through the planetary gear set 15 and the hydraulic torque converter 14 to the intermediate shaft 12 and then through the clutch 17 and shaft 13 to the sun gear 34. Since the brake 20 is engaged at this time the planetary pinion carrier 39 is stationary and inasmuch as the sun gear 34 is driven at a forward direction the drive proceeds through the pinions 37 and 38 to the ring gear 33 and to the driven shaft 11. The planetary gear set 16 affords a reduction at all times during low speed forward drive and there is also a reduction between the drive shaft 10 and intermediate shaft 12 until the planetary gear set 15 and the hydraulic torque converter 14 both become locked up so that they rotate as a unit.

Second or intermediate forward speed drive is established through the transmission when the clutch 17 and the brake 19 are engaged while the other clutch and brakes are disengaged. The drive from the drive shaft 10 to the sun gear 34 is the same as traced above for low speed drive but in second speed forward drive the sun gear 35 is held stationary instead of the carrier 39 so that there is less reduction through the planetary gear set 16. At this time forward rotation of the sun gear 34, which will be assumed to be in a clockwise direction looking at the transmission from the left, imparts a counterclockwise direction of rotation to the planetary pinions 37 and a clockwise direction of rotation to the pinions 38. But the pinions 38 mesh with and revolve around the stationary sun gear 35 and therefore since they also mesh with the ring gear 33 the driven shaft 11 is driven at a reduced speed ratio. It is apparent that the reduction during second forward speed drive in the planetary gear set 16 is less than during the low forward speed drive due to the fact that the pinions 38 may themselves rotate in a forward direction orbitally as well as axially.

During high forward speed drive both clutches 17 and 18 are engaged while all of the brakes are disengaged. Engagement of these clutches causes both sun gears 34 and 35 to be directly connected with the intermediate shaft 12. Both sun gears 34 and 35 are driven in a forward direction at the same speed and therefore the planetary gear set 16 is locked up and the driven shaft 11 is driven in a forward direction at the same speed as the intermediate shaft 12.

Reverse drive is established through the transmission by engaging the clutch 18 and the brakes 20 and 21 while the clutch 17 and the brake 19 are disengaged. It is desirable to utilize the positive brake 21 during reverse drive because of the fact that the reaction on the reaction element, which is the planetary pinion carrier 39 at this time, is greater during reverse drive. The engagement of the clutch 18 causes the sun gear 35 to be driven in a forward direction at the same speed as the intermediate shaft 12. Since the planetary gear carrier 39 is held stationary by both brakes 20 and 21 forward rotation of the sun gear 35 causes the planetary pinions 38 to be rotated reversely and they in turn impart a reverse rotation to the ring gear 33 and driven shaft 11. The hydraulic torque converter 14 and the front planetary gear set 15 function during reverse drive in substantially the same manner as during all other drives. The rear planetary gear set 16, during reverse drive, in addition to affording a further reduction also provides a reversal of the drive.

The following is a description of the fluid control mechanism for actuating the fluid pressure operated clutches 17 and 18 and the fluid pressure operated brakes 19 and 20.

A valve block 55 is provided with three bores 56, 57 and 58 for respectively receiving a forward valve 59, a solenoid valve 60 and a reverse valve 61. A sleeve 62 is rigidly seated in the bore 56 and the valve 59 is reciprocable therein. The sleeve 62 has a plurality of external grooves 63–67. Each of the grooves 63–67 has an aperture extending completely through the sleeve 62. The groove 63 communicates with a conduit 68, the groove 64 communicates with a bleed conduit 69, the groove 65 communicates with a fluid supply conduit 70, the groove 66 communicates with a conduit 71 and the groove 67 communicates with a conduit 72. The valve 59 is provided with a plurality of grooves 73, 74, 75 and 76 and a plurality of lands 77, 78 and 79 formed on the valve respectively separate the grooves. The valve 59 is internally bored, as at 80 and this internal bore connects the grooves 74 and 76 of the valve.

The solenoid valve bore 57 has a sleeve 57a seated therein within which the valve 60 is reciprocable. The sleeve 57a is provided with a plurality of external grooves 81, 82, 83 and 84. Each of the grooves 81–84 communicates respectively with the inside of the sleeve 57a. The groove 81 communicates with a bleed conduit 85, the groove 82 communicates with a conduit 86, the groove 83 communicates with the conduit 68 and the groove 84 communicates with a conduit 87. The valve 60 itself is internally bored as at 88. The valve 60 is also provided with two external grooves 89 and 90 which are separated by means of a land 91. The bore 88 in the valve 60 is enlarged at one end for receiving a spherically shaped member 92 formed on one end of an armature 93 of a solenoid 94. A compression spring 95 mounted between the valve 60 and a block 96 normally urges the valve 60 into the position in which it is shown in Fig. 5. This is the second speed drive position of the solenoid valve 60. When the solenoid 94 is energized, the armature 93 is pulled downwardly to move the valve 60 into its high speed position. The sleeve 57a is also provided with a plurality of radially extending apertures 97 which communicate with a bleed conduit 98.

The reverse valve 61 is reciprocable within a sleeve 99 seated within the bore 58. The sleeve 99 is formed with a plurality of external grooves 101–107, each of which communicates with the interior of the sleeve 99. The groove 101 communicates with a conduit 108, the groove 102 communicates with the conduit 71, the groove 103 communicates with the conduit 72, the groove 104 communicates with a conduit 109, the groove 105 communicates with the conduit 87, the groove 106 communicates with a conduit 110, and the groove 107 communicates with a pressure supply conduit 111.

Each of the bores 56 and 58 are sealed at either end thereof by means of a suitable sealing plate 112. The top end of the bore 56 communicates with a bleed conduit 113 while the other end of the bore 56 communicates with a bleed conduit 114 and these bleed conduits facilitate the reciprocation of the valve 59. The top end of the bore 58 communicates with a bleed conduit 115 and the other end of the bore 58 communicates with a bleed conduit 116, both of these bleed conduits together permitting easy reciprocation of the valve 61 within the sleeve 99.

With reference now particularly to Fig. 4 the forward valve 59 is provided with a peripheral groove 117 within which a pin 118 secured to a shift lever 119 is seated. The shift lever 119 is secured to a shaft 120 and is oscillatable to three positions corresponding respectively to low, neutral and second-high. Detent means are provided for retaining the lever 119 in any one of the selective positions and comprises a ball 121 and the slots 122 formed in the lever 119. The ball 121 is mounted within a suitable aperture 123 and a spring 124 continuously urges the ball 121 towards the lever 119. A manually operable lever 125 (see Fig. 2) is also secured to the shaft 120 and upon movement of the lever 125 the shift lever 119 is also moved. It is apparent that upon movement of the shift lever 119 to any one of its selective positions, the forward valve 59 also moves to the corresponding selective position.

The reverse valve 61 is also formed with a peripheral groove 126 within which a pin 127 formed on a lever 128 is seated. The lever 128 is rigidly secured to a shaft 129 and the lever 128 and shaft 129 are reciprocable between a neutral and a reverse position. When the lever and pin are so moved the reverse valve 61 is likewise moved to either a neutral or reverse position. Intermediate between the neutral and reverse positions of the reverse valve 61 is a low brake-off position and when the valve 61 occupies this position during a shift from reverse to low forward speed drive suitable fluid circuits are established for facilitating the shift. Details of these fluid circuits are to be described hereinafter. Also secured to the shaft 129 is a reverse valve lever 130 (see Fig. 2) and this lever likewise is reciprocable between a neutral and a reverse drive position.

The linkage for shifting the reverse valve 61 will now be described. A bell crank lever 131 pivotally mounted on the valve block 55 by means of a bolt or pin 132 has a second arm 133 with which a link 134 is connected. The link 134 is pivotally connected, as at 135, to a lever 136 which itself is pivotally connected to a lever 137 by means of a bolt or pin 138. The lever 137 is secured to a pivotable shaft 139 which also has a positive brake actuating arm 140 secured thereto. The arm 140 carries a pin 141 which is seated within a slot 142 formed in the pawl 42. The levers 137 and 140 are reciprocable between two limit positions corresponding respectively to the positions wherein the sprag 42 is out of engagement with the teeth 41 and wherein the sprag 42 engages the teeth 41. The pivot pin 135 extends through the lever 136 and projects through an elongated slot 143 formed in the end of the lever 137. The lever 136 is also pivotally connected, as at 144, to a link 145 which is pivotally secured to the reverse valve lever 130. A block 146, suitably secured to the link 134 by means of a bolt 147 has a tension spring 148 secured thereto and a spring 148 is secured at its other end to the pin 138.

Reverse drive through the present transmission may be established when the bell crank lever 131 is shifted from its neutral to its reverse drive position. During such a shifting movement of the bell crank 131 the link 134 is moved to the right and the pin 135 causes both the lever 136 and the lever 137 to also be pivoted to the right to their counterclockwise position. In this position of the lever 137 the sprag 42 is engaged with the teeth 41 in order to brake the carrier 39. In this position of the lever 136 the reverse valve lever 130 is moved to its reverse drive position causing a corresponding movement of the valve 61.

Figure 3A:
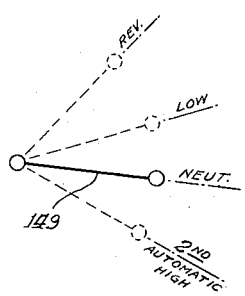
Fig. 3a is a horizontal schematic view showing the shift lever positions.
Figure 3B:
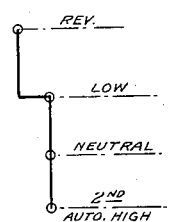
Fig. 3b is a vertical schematic view showing the shift lever positions.

Referring now to Figs. 3a and 3b a manually operable selector lever 149 is pivotal in a horizontal plane to any one of four positions, corresponding respectively to reverse drive, low speed forward drive, neutral and second and automatic high forward speed drive. The selector lever 149, in order to be moved from its low forward drive position to its reverse drive position must be moved slightly in a vertical plane as indicated in Fig. 3b. When the selector lever 149 is moved in the horizontal plane to either its low, neutral or second and high speed forward drive positions it engages and moves the lever 125 and causes a corresponding movement of the forward valve 59. When, however, the selector lever occupies its low speed forward drive position it may be moved slightly in a vertical plane and then moved further in a horizontal plane into its reversed drive position. When the selector is moved in this manner from its low speed forward drive position to its reverse drive position it becomes disengaged from the lever 125 and engages the bell crank lever 131 and in turn moves it from its neutral position to its reverse drive position to thereby cause the establishment of reverse drive through the transmission.

The electrical circuit for controlling the energization and deenergization of the solenoid 94, which in turn effects a shift from second forward speed drive to high forward speed drive, will now be described. This circuit is shown in Fig. 11 of the drawings.

The control circuit shown in Fig. 11 includes, besides the solenoid 94, a relay 150, a manifold vacuum control switch 151, a kickdown switch 152 designed to be open when the accelerator of the vehicle is moved to its full open throttle kickdown position, a limit switch 153 and a governor control switch 154. The governor control switch 154 is designed to close at some speed such as a speed between 13 and 15 M. P. H. and remain closed at all speeds above this speed. The limit switch 153 is a governor operated switch designed to close at high speed and when such a switch is used in transmissions it is customary to have this switch closed at all speeds of above, say 50 M. P. H. The manifold vacuum control switch 151 is designed to close when the vacuum in the manifold of the vehicle increases to a predetermined value. It is contemplated that in order to cause a closure of this manifold vacuum control switch 151 it will be necessary that the accelerator of the vehicle be moved substantially to its closed throttle position. The relay 150 includes a winding 155 and two contact pairs 156 and 157. Both of the contact pairs 156 and 157 are designed to close upon energization of the winding 155 of the relay 150. The solenoid 94 includes an actuating winding 158 and a holding winding 159. In order to pull down the armature 93 of the solenoid 94 it is necessary that both windings 158 and 159 be energized. When the armature 93 is pulled down to its high speed forward drive position it opens a contact pair 160 in the solenoid 94 and thereafter only the winding 159 remains energized, but this is sufficient to hold the armature 93 in its high speed forward drive position.

When the vehicle is operating in second speed forward drive and the speed thereof is sufficient to cause closure of the governor contacts 154, release of the accelerator to its closed throttle position causes the manifold vacuum to increase sufficiently to close the manifold vacuum control switch 151. A circuit is then established from ground through the vehicle battery 161 through the vehicle ignition switch 162, which obviously is closed at this time, through a fuse 163, through the winding 155 of the relay 150, through the vacuum controlled switch 151, through the kickdown switch 152, and through the governor controlled switch 154 to ground. Energization of the relay 150 causes it to close the contact pairs 156 and 157. Closure of the contact pair 157 completes a holding circuit for the relay 150 which bypasses the manifold vacuum control switch 151 and therefore it is no longer necessary to retain the vehicle accelerator in its closed throttle position. Closure of the contact pair 156 completes a circuit from ground through the vehicle battery, through the ignition switch 162, through the fuse 163, through the contact pair 156, and through both windings 158 and 159 of the solenoid 94 to ground. When the armature 93 of the solenoid 94 is pulled down to its high speed forward drive position the contact pair 160 opens to deenergize the winding 158, and the holding winding 159 alone retains the solenoid armature 93 in its high speed forward drive position.

When the vehicle is traveling in high speed forward drive, and assuming that the speed thereof is below the speed at which the limit switch 153 closes, the depression of the accelerator pedal to a full open throttle position to cause opening of the kickdown switch 152 breaks the energizing circuit for the relay 150 and thereby causes deenergization of this relay. When the relay 150 becomes deenergized its contact pair 156 opens and thereby deenergizes the solenoid 94 to cause the armature 93 to be moved back to its second speed forward drive position under the urging of the compression spring 95.

Obviously, if the speed of the vehicle is above that speed at which the limit switch 153 is closed, depression of the accelerator pedal to its full open throttle position to cause an opening of the kickdown switch 152 has no effect and the winding 155 of relay 150 remains energized so that the vehicle continues in high speed forward drive. The limit switch 153 thus prevents excessive racing of the vehicle engine when the vehicle is traveling at high speed.

When the vehicle engine is idling and the transmission is conditioned for neutral, the manually controlled selector lever 149 occupies its neutral position. In this position of the selector lever 149 the forward valve 59 occupies its neutral position, the reverse valve occupies its neutral position and the solenoid valve 60 occupies its second speed drive position as shown in Fig. 5. Under this condition of operation fluid under pressure is supplied by the fluid pressure supply conduit 70, to the groove 74 in the valve 59 and to the bore 80 in the valve 59, but as seen in Fig. 5 all exits from the bore 80 are closed. Fluid under pressure is also supplied to the conduit 111 but since the valve 61, when in its neutral position, closes the apertures in the groove 107 the fluid can go no further. Thus during neutral there are no fluid pressure supply circuits established to any of the brakes or clutches of the transmission. During neutral the cylinder behind the operating piston 46 for the friction clutch 17 is bled over a fluid circuit extending from the cylinder, through the conduit 108, through the groove 101, through the groove 61a, through the groove 102, through the conduit 71, through the grooves 66 and 73, and out through the bleed conduit 113. The cylinder behind the operating piston 51 of the friction clutch 18 is bled over a fluid circuit extending from this cylinder through the conduit 110 through the grooves 106, 61c and 105, through the conduit 87, through the grooves 84 and 89 to the bleed conduit 98. The friction brakes 19 and 20 are each provided with operating cylinders 164 and 165 respectively and the operating cylinder 164 for the brake 19 is bled over a circuit extending through the conduit 86, through the grooves 82, 90 and 83, through the conduit 68, through the grooves 63, 75 and 64, and out through the bleed conduit 69. The operating cylinder 165 for the brake 20 is bled over a fluid circuit extending from the operating cylinder 165 through the conduit 109, through the grooves 104, 61b and 103, through the conduit 72, through the grooves 67 and 73, and out through the bleed conduit 113. Also during neutral, since the operating lever 133 occupies its neutral position, the sprag 42 of the positive brake 21 is also disengaged from the teeth 41. It is therefore seen that during neutral all of the clutches and brakes in the transmission are disengaged.

Figure 2:
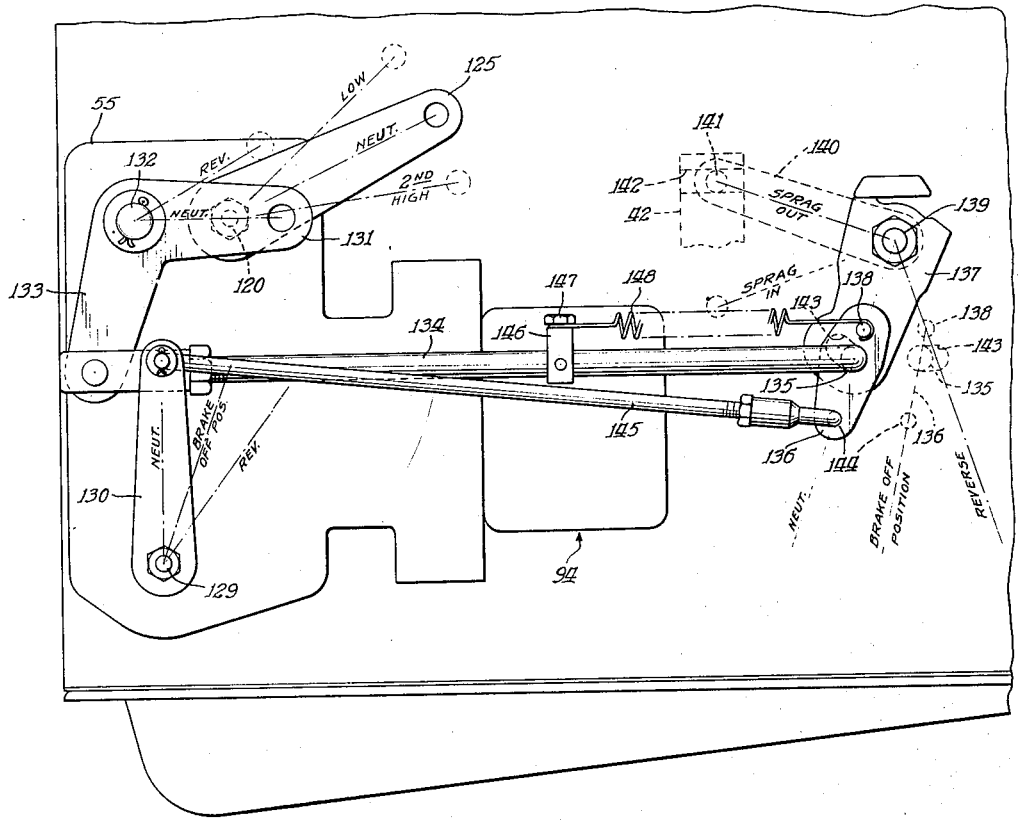
Fig. 2 is a view showing the reverse valve and sprag brake control linkage.

To establish low forward speed drive through the transmission the manually operable selector lever 149 is moved in a horizontal plane to its low speed drive position. This causes the lever 125 to be pivoted counterclockwise (as seen in Fig. 2) to move the valve 59 to its low speed position (see Fig. 6). The lever 133 is not moved during a shift of the selector lever 149 from neutral to low speed position and therefore the positive brake 21 remains disengaged and the reverse valve 61 remains in its neutral position. Also in low speed forward drive the solenoid 94 remains deenergized and the compression spring 95 holds the solenoid valve 60 in its second speed drive position. The brake operating cylinder 164 and the clutch operating cylinder behind the piston 51 of the clutch 18 are both bled over the same circuits as traced during neutral. Fluid under pressure is supplied to the operating cylinder behind the piston 46 for actuating the clutch 17 over a circuit extending from the pressure supply conduit 70, through the grooves 65, 73 and 66, through the conduit 71, through the grooves 102, 61a and 101, and through the conduit 108 to the cylinder behind the piston 46. A circuit for actuating the brake 20 extends to its operating cylinder 165 from the pressure supply conduit 70, through the grooves 65, 73 and 67, through the conduit 72, through the grooves 103, 61b and 104, and through the conduit 109 to the operating cylinder 165.

In order to condition the transmission for second speed forward drive the manually operable selector lever 149 is moved in a horizontal plane to its second and automatic high speed position and when it is so moved the forward valve 59 is moved to its second and high position as shown in Fig. 7 of the drawings.

The solenoid 94 remains deenergized and consequently the solenoid valve 60 remains in its second speed position. The positive brake 21 remains disengaged and the reverse valve 61 remains in its neutral position. During second speed forward drive the operating cylinder for the friction clutch 18 is bled over the same circuit as previously traced during neutral and the operating cylinder 165 for the brake 20 is bled over the same circuit as previously traced during neutral. Fluid under pressure is supplied to the operating cylinder behind the piston 46 of the friction clutch 17 over a fluid circuit extending from the pressure supply conduit 70 through the grooves 65, 74 and 66, through the conduit 71, through the grooves 102, 61a and 101, and through the conduit 108 to the operating cylinder for the friction clutch 17. Fluid under pressure is supplied to the operating cylinder 164 of the friction brake 19 over a fluid circuit extending from the pressure supply conduit 70 through the grooves 65 and 74, through the bore 80, through the apertures at the lower end of the bore 80, through the grooves 76 and 63, through the conduit 68, through the grooves 83, 90 and 82 and through the conduit 86 to the operating cylinder 164.

When the transmission is operating in second forward speed drive, it may be automatically conditioned for operation in direct or high forward speed drive and to so condition the transmission, the vehicle must be traveling at a sufficiently high speed to close the governor contacts 154, and thereafter a release of the vehicle accelerator pedal to its closed throttle position causes the manifold vacuum switch 151 to close. It will be recalled that when the governor contact 154 and the manifold vacuum switch 151 are both closed, when the vehicle is operating in second forward speed drive, electrical circuits are completed for energizing the solenoid 94 and when this solenoid is energized the solenoid valve 60 is moved to its high speed position (see Fig. 8). The forward valve 59 and the reverse valve 61 remain in the same position that they occupy during second forward speed drive. During high forward speed drive all of the brakes 19, 20 and 21 are disengaged, the operating cylinder 165 for the brake 20 being bled over a bleed circuit which is the same as previously traced during neutral. A bleed circuit for the operating cylinder 164 of the brake 19, which causes disengagement of the brake 19, extends from the cylinder 164, through the conduit 86, through the grooves 82, 90 and 81 to the bleed conduit 85. Fluid under pressure is supplied to the operating cylinder behind the piston 46 of the clutch 17 over a circuit extending from the pressure supply conduit 70, through the grooves 65, 74 and 66, through the conduit 71, through the grooves 102, 61a and 101, and through the conduit 108 to the operating cylinder of the clutch 17. Fluid under pressure is supplied to the operating cylinder behind the piston 51 of the clutch 18 over a circuit extending from the pressure supply conduit 70, through the grooves 65 and 74, through the bore 80, through the grooves 76 and 63, through the conduit 68, through the grooves 83, 89 and 84, through the conduit 87, through the grooves 105, 61c and 106, and through the conduit 110 to the operating cylinder for the clutch 18. If the speed of the vehicle drops below the critical speed at which the governor contacts 154 close, the solenoid 94 becomes deenergized and second speed drive through the transmission will then be re-established. Likewise, if the vehicle is traveling at a speed below that at which the limit switch 153 closes, depression of the vehicle accelerator pedal to its full open throttle position to cause the kickdown switch 152 to open, will also break the energizing circuit for the solenoid 94 in order to again place the transmission in second forward speed drive.

In order to condition the present transmission for reverse drive, the manually operable selector lever 149 is first moved from its neutral to its low speed position. This causes the forward valve 59 to assume its low speed position. The selector lever 149 is then moved slightly vertically and further moved in a horizontal plane to its reverse drive position. This movement of the selector lever 149 from its low speed position to its reverse drive position causes the bell crank lever 133 to be moved from its neutral position to its reverse position and the linkage disclosed in Fig. 2 is then effective to move the sprag 42 into engagement with the teeth 41 and also to move the reverse valve 61 from its neutral to its reverse drive position, as shown in Fig. 9. Thus in reverse drive the positive brake 21 is engaged, and the friction brake 20 and friction clutch 18 are also both engaged. The friction clutch 17 and the friction brake 19 are both disengaged. The solenoid 94 is deenergized during reverse drive and accordingly the solenoid valve 60 assumes its second forward speed drive position during reverse drive. The operating cylinder 164 for the friction brake 19 is bled over a bleed circuit which is the same as previously traced during neutral. The operating cylinder behind the piston 46 of the friction clutch 17 is bled over a bleed circuit extending from this operating cylinder, through the conduit 108, through the groove 101, and out through the bleed conduit 115. Fluid under pressure is supplied to the operating cylinder 165 of the brake 20 over a fluid circuit extending from the fluid pressure supply conduit 70, through the grooves 65 and 73, and either through the groove 67, conduit 72, and groove 103, or through the groove 66, conduit 71, and groove 102, to the groove 61a, through the groove 104 and through the conduit 109 to the operating cylinder 165. Fluid under pressure is supplied to the cylinder behind the operating piston 51 of the clutch 18 over a fluid circuit extending from the fluid pressure supply conduit 111, through the grooves 107, 61c and 106, and through the conduit 110 to the operating cylinder of the clutch 18.

During reverse drive, when looking at the transmission from the left in Fig. 1, the direction of rotation of the driven shaft 11 is counterclockwise and the direction of reaction on the planetary gear carrier 39 is clockwise. This clockwise reaction on the planetary gear carrier 39 causes the teeth 41 to jam against the sprag 42, thus making it very difficult to withdraw the sprag 42 from engagement with the teeth 41. Since the friction brake 20 is also engaged during reverse drive this brake also holds the planetary gear carrier 39 in the position wherein the teeth 41 and the sprag 42 are in jammed or locked engagement. It is customary in transmissions of the type employing both a friction brake and a positive brake for braking the reaction element of a planetary gear set during reverse drive, as exemplified by the construction disclosed in the copending application of Donald W. Kelbel, Serial No. 793,006, filed December 20, 1947, now Patent No. 2,682,177, to also provide a low forward speed drive in which only the friction brake is engaged. In such transmissions if the speed ratio changing mechanism is so designed as to be changeable directly between reverse and low forward drive without intermediately passing through a neutral position, the problem of disengaging the positive brake when it is desired to change from reverse to low forward drive is very difficult. The present invention, however, provides a very simple solution to this problem as will now be described.

Assuming that the transmission is conditioned for reverse drive and that it is desired to change from reverse to low forward drive, the manually operable selector lever 149 is moved from its reverse drive position towards its low forward drive position. Because the sprag 42 is locked in engagement with the teeth 41 due to the reaction upon the planet gear carrier 39, the sprag 42 tends to remain in engagement with the teeth 41. Pivotal movement of the bell crank 133 from its reverse drive position toward its neutral position initially causes the lever 136 to pivot in a clockwise direction about the pivot bolt 138, the pin 135 sliding in the slot 143. The lever 136 is moved in this clockwise direction until the reverse valve lever 130 reaches an intermediate position and upon its reaching this position it will have moved the reverse valve 61 to an intermediate position which may be termed a "low brake off position." The condition of the fluid control system when the reverse valve 61 occupies its low brake off position is shown in Fig. 10.

When the change is being made from reverse to low forward drive and the reverse valve 61 occupies its low brake off position the brake operating cylinders 164 and 165, and the clutch operating cylinder behind the piston 51 of the clutch 18 are all bled so that brakes 19 and 20, and clutch 18, are inoperative. The bleed circuit for the operating cylinder 165 extends from the cylinder through the conduit 109, through the grooves 104, 61b and 105, through the conduit 87, through the grooves 84 and 89, and through the apertures 97 to the bleed conduit 98. The brake operating cylinder 164 is bled over the same circuit as traced during neutral. The cylinder behind the piston 51 is bled over a circuit extending from the cylinder through the conduit 110, through the groove 106, groove 61c and 105, through the conduit 87, through the grooves 84 and 89, and through the apertures 97 to the bleed conduit 98. Fluid under pressure, however, is applied to the piston 46 of the clutch 17 in order to cause engagement of this clutch and this fluid circuit extends from the oil pressure supply conduit 70, through the grooves 65 and 73, and through either the groove 67, conduit 72, and groove 103, or through the groove 66, conduit 71, and groove 102, to the groove 61a, and thence through the groove 101 and conduit 108 to the operating cylinder behind the piston 46 of the clutch 17.

From Fig. 10, it is therefore apparent that the clutch 17 is engaged when the reverse valve 61 occupies its low brake off position and this occurs when a change is being made from reverse drive to low forward speed drive. The engagement of the clutch 17 causes the sun gear 34 to be rotated in a clockwise direction and due to the connection of the sun gear 34 with the driven shaft 11 through the planetary pinions 37 and 38 and through the ring gear 33, the drive shaft 11 also tends to be rotated clockwise. This tendency of the driven shaft 11 to be rotated clockwise obtains only for so long as the sprag 42 remains engaged with the teeth 41 on the planetary gear carrier 39. During this period when the driven shaft 11 tends to rotate clockwise, the direction of reaction upon the planet gear carrier 39 reverses, changing to a counterclockwise direction and this moves the teeth 41 slightly and unlocks them from the sprag 42. Thereafter the sprag 42 may be easily withdrawn to its disengaged position.

When the reaction on the planetary gear carrier 39 changes to the counterclockwise direction the spring 148 causes the lever 137 (see Fig. 2) to rotate in a clockwise direction about its pivot 139 and this withdraws the sprag 42 from engagement with the teeth 41. The bell crank lever 133 may then be easily moved to its neutral position and upon such movement both levers 137 and 136 are pivoted clockwise about the pivot point 139, with the reverse valve lever 130 being moved from its low brake off position to its neutral position. When the valve 61, which is attached to the reverse valve lever 130 and is movable therewith, reaches its neutral position it will be noted that all of the valves 59, 60 and 61 are then in their low speed forward drive position, as shown in Fig. 6. The friction clutch 17 remains engaged and fluid under pressure is supplied to the operating cylinder 165 of the brake 20 to cause engagement of this brake. The transmission is then completely conditioned for low forward speed drive.

It should be noted, in connection with the change from reverse to low forward speed drive, that actually a power train, which is substantially the same as the low forward speed power train, is temporarily established when the reverse valve 61 occupies its low brake off position. This temporary power train causes a reversal of the reaction on the planetary gear carrier 39 to unlock the sprag 42 from the teeth 41 and permit the withdrawal of the sprag 42 from engagement with the teeth 41. As soon as the sprag 42 is unlocked from the teeth 41 this temporary power train is immediately broken. Thereafter as soon as the linkage mechanism shown in Fig. 2 can be moved to its neutral position the transmission is again conditioned for normal low forward speed operation.

From the foregoing description it is apparent that the present invention provides a smooth and efficient transmission affording three forward drives and a reverse drive between the drive and driven shafts 10 and 11 respectively. Further, the present invention provides a simple and easily operated means for causing a disengagement of the positive brake which is engaged during reverse drive. It is contemplated that numerous changes and modifications may be made in the invention without departing from the spirit or scope thereof.

I claim:

1. In a transmission, the combination of a drive shaft, a driven shaft, means for establishing a power train between said shafts and including a gear set having a reaction member, a first engaging means for engaging said reaction member and holding it stationary during the establishment of said power train, the reaction on said reaction member being in one direction during the establishment of said power train and tending to prevent disengagement of said first engaging means from said reaction member, a second engaging means effective upon engagement for reversing the direction of reaction on said reaction member, and means operating said last-mentioned means during the period in which said reaction member is held stationary for facilitating the disengagement of said first engaging means from said reaction member and disestablishing said power train.

2. In a transmission, the combination of a drive shaft, a driven shaft, means for establishing a power train between said shafts and including a gear set having a reaction member, a brake for holding said reaction member stationary during the establishment of said power train, the reaction on said reaction member being in one direction during the establishment of said power train and tending to retain said brake engaged with said reaction member, engaging means effective upon engagement for reversing the direction of reaction on said reaction member, and means operating said last-mentioned means during the period in which said reaction member is held stationary for facilitating the disengagement of said brake from said reaction member and disestablishing said power train.

3. In a transmission, the combination of a drive shaft, a driven shaft, means for establishing a power train between said shafts and including a planetary gear set having a reaction member, a brake for holding said reaction member against rotation during the establishment of said power train, the reaction on said reaction member being in one direction during the establishment of said power train and tending to prevent disengagement of said brake from said reaction member, engaging means effective upon engagement for reversing the direction of reaction on said reaction member, and means operating said engaging means during the period in which said reaction member is held against rotation for facilitating the disengagement of said brake from said reaction member and disestablishing said power train.

4. In a transmission, the combination of a drive shaft, a driven shaft, means for establishing a power train between said shafts and including a planetary gear set having a planet gear carrier, a brake for engaging and holding said carrier stationary to provide a reaction member for said gear set during the establishment of said power train, the reaction on said carrier being in one direction during the establishment of said power train and tending to prevent disengagement of said brake from said carrier, engaging means effective upon engagement for reversing the direction of reaction on said carrier, and means operating said last-mentioned means during the period in which said carrier is held stationary for facilitating the disengagement of said brake from said carrier and disestablishing said power train.

5. In a transmission, the combination of a drive shaft, a driven shaft, means for establishing a power train between said shafts and including a gear set having a reaction member, a positive brake for holding said reaction member stationary during the establishment of said power train, the reaction on said reaction member being in one direction during the establishment of said power train and tending to prevent disengagement of said brake from said reaction member, engaging means effective upon engagement for reversing the direction of reaction on said reaction member, and means operating said last-mentioned means during the period in which said reaction member is held stationary for facilitating the disengagement of said brake from said reaction member and disestablishing said power train.

6. In a transmission, the combination of a drive shaft, a driven shaft, means for establishing a power train between said shafts and including a gear set having a reaction member, a first engaging means for engaging said reaction member and holding it stationary during the establishment of said power train, the reaction on said reaction member being in one direction during the establishment of said power train and tending to prevent disengagement of said first engaging means from said reaction member, second engaging means effective upon engagement for temporarily establishing a different power train between said shafts whereby the direction of reaction on said reaction member is reversed, and means operating said last-mentioned means during the period in which said reaction member is held stationary to thereby enable the disengagement of said first engaging means from said reaction member for breaking said first mentioned power train.

7. In a transmission, the combination of a drive shaft, a driven shaft, means for establishing a power train between said shafts and including a planetary gear set between said shafts and including a planetary gear set having a reaction member, said reaction member having a plurality of brake teeth formed thereon, a positive brake movable into and out of engagement with said teeth, said brake being effective to hold said reaction member stationary upon engagement with said teeth, the reaction on said reaction member being in one direction during the establishment of said power train and tending to prevent disengagement of said brake from said teeth, engaging means effective upon engagement for temporarily establishing a different power train between said shafts whereby the direction of reaction on said reaction member is reversed, and means operating said last-mentioned means during the period in which said reaction member is held stationary to thereby enable the disengagement of said brake from said teeth for breaking said first mentioned power train.

8. In a transmission, the combination of a drive shaft, a driven shaft, means for establishing a power train between said shafts to thereby cause the driven shaft to be rotated in one direction and including a reaction member and means for engaging and holding the reaction member stationary during the establishment of the power train, the reaction on said reaction member tending to lock said engaging means and reaction member together during the establishment of said power train so as to prevent disengagement thereof, means for temporarily establishing a different power train between said shafts tending to cause the driven shaft to be rotated in the opposite direction to thereby reverse the reaction on said reaction member, and means operating said last-mentioned means during the period in which said reaction member is held stationary whereby said engaging means is released from said reaction member and said first mentioned power train is broken.

9. In a transmission, the combination of a drive shaft, a driven shaft, a planetary gear set having a plurality of input elements and a reaction member, means for connecting said drive shaft to one of said input elements, means for holding said reaction member stationary for thereby completing a drive between said shafts and causing said driven shaft to be rotated in one direction, the reaction on said reaction member during said drive being such as to lock the reaction member to the holding means and prevent disengagement thereof, and means for connecting said other input element to said drive shaft to temporarily complete a different drive between said shafts tending to cause the driven shaft to be rotated in the opposite direction while said holding means and reaction member remain locked, the reaction on said reaction member changing during the temporary different drive to thereby permit the reaction member to release the holding means.

10. In a transmission, the combination of a drive shaft, a driven shaft, a planetary gear set having a plurality of input elements and a reaction member, means for connecting said drive shaft to one of said input elements, a brake for holding said reaction member stationary and effective upon said drive shaft being connected to said one input element to thereby complete a drive between said shafts and cause said driven shaft to be rotated in one direction, the reaction on said reaction member during said drive being such as to lock it to said brake and prevent disengagement thereof, and means operative during the period in which said brake holds said reaction member stationary for disconnecting said one input element from said drive shaft and connecting another of said input elements to said drive shaft to thereby change the reaction on said reaction member and cause it to release said brake.

11. In a transmission, the combination of a drive shaft, a driven shaft, a gear set including first and second input elements and a reaction element, means for completing a drive between said shafts and including a positive brake and a friction brake for holding said reaction element stationary and a first clutch effective upon engagement for connecting said first input element to said drive shaft, the driven shaft being driven in one direction and the reaction on said reaction element being in the opposite direction and tending to lock said positive brake to said reaction element during said drive, manually controlled means operable during the period in which said reaction element is held stationary for effecting a disengagement of said friction brake and said first clutch and effecting engagement of a second clutch for connecting said second input element to said drive shaft, whereby said driven shaft tends to be driven in said opposite direction and the reaction on said reaction element is in said one direction and is effective to unlock said positive brake from said reaction element to thereby break said drive between said shafts.

12. In a transmission, the combination of a drive shaft, a driven shaft, a gear set including first and second input elements and a reaction element, means for completing a drive between said shafts and including a positive brake and a friction brake for holding said reaction element stationary and a first clutch effective upon engagement for connecting said first input element to said drive shaft, the driven shaft being driven in one direction and the reaction on said reaction element being in the opposite direction and tending to lock said positive brake to said reaction element during said drive, manually controlled means operable during the period in which said reaction element is held stationary for controlling the operation of said friction brake and said clutches and including a valve effective upon the operation of the manually controlled means for effecting a disengagement of said friction brake and said first clutch and effecting an engagement of a second clutch for connecting said second input element to said drive shaft, whereby said driven shaft tends to be driven in said opposite direction and the reaction on said reaction element is in said one direction and is effective to unlock said positive brake from said reaction element to thereby break said drive between said shafts.

13. In a transmission, the combination of a drive shaft, a driven shaft, a gear set including a reaction element, means for holding said reaction element stationary to complete a drive in one direction between said shafts and including a brake, said brake being engaged during the completion of said drive, the reaction on said reaction element being in the opposite direction during said drive and tending to lock said brake and said reaction element together, means tending to drive said driven shaft in said opposite direction, the reaction on said reaction element being in said one direction and tending to unlock said brake and said reaction element during the tendency of said driven shaft to be driven in said opposite direction, and means initially operable during the period in which said reaction element is held stationary to render said second named means effective and operable thereafter to disengage said brake from said reaction element when the brake and reaction element have been unlocked by the reaction on the reaction element.

14. In a transmission, the combination of a drive shaft, a driven shaft, a gear set including a reaction element, means for holding said reaction element stationary to complete a drive in one direction between said shafts, and including a friction brake and a positive brake, both brakes being engaged during the completion of said drive, the reaction on said reaction element being in the opposite direction during said drive and tending to lock said positive brake and said reaction element together, means for causing disengagement of said friction brake and simultaneously tending to drive said driven shaft in said opposite direction, the reaction on said reaction element being in said one direction and tending to unlock said positive brake and said reaction element during the tendency of said driven shaft to be driven in said opposite direction, and means initially operable during the period in which said reaction element is held stationary to render said second named means effective and operable thereafter to disengage said positive brake from said reaction element when the positive brake and reaction element have been unlocked by the reaction on the reaction element.

15. In a transmission, the combination of a drive shaft, a driven shaft, a gear set including a reaction element, means for holding said reaction element stationary to complete a drive in one direction between said shafts and including a friction brake and a positive brake, both brakes being engaged during the completion of said drive, the reaction on said reaction element being in the opposite direction during said drive and tending to lock said positive brake and said reaction element together, a motor for engaging and disengaging said friction brake, means for causing said motor to disengage said friction brake and for simultaneously causing said driven shaft to tend to be driven in said opposite direction, the reaction on said reaction element being in said one direction and tending to unlock said positive brake and said reaction element during the tendency of said driven shaft to be driven in said opposite direction, and means initially operable during the period in which said reaction element is held stationary to render said second named means effective and operable thereafter to disengage said positive brake from said reaction element when the positive brake and reaction element have been unlocked by the reaction on the reaction element.

16. In a transmission, the combination of a drive shaft, a driven shaft, a gear set including a reaction element, means for completing a reverse drive and a forward drive between said shafts and including a positive brake and a friction brake, said friction brake being engageable with said reaction element to hold it stationary during the forward drive and both of said brakes being engageable with said reaction element to hold it stationary during said reverse drive, the reaction on said reaction element tending to lock the positive brake in its engaged condition and the friction brake tending to hold the positive brake locked during the reverse drive, and means for directly changing the drive from reverse to forward and including means for temporarily disengaging said friction brake from said reaction element to thereby permit the positive brake to become unlocked and disengaged from the reaction element before the completion of the forward drive between the shafts.

17. In a transmission, the combination of a drive shaft, a driven shaft, a gear set including a reaction element, means for completing a reverse drive and a forward drive between said shafts and including a positive brake and a friction brake, said friction brake being engageable with said reaction element to hold it stationary during the forward drive and both of said brakes being engageable with said reaction element to hold it stationary during the reverse drive, the reaction on said reaction element tending to lock the positive brake in engagement with the reaction element and the friction brake tending to hold the positive brake locked during the reverse drive, and means movable between two limit positions and effective when in one of said positions to cause said drive completing means to complete said reverse drive and when in the other of said limit posititions effective to cause said drive completing means to complete said forward drive and effective further when in an intermediate position to cause said friction brake to be disengaged from said reaction element to thereby permit the positive brake to become unlocked and disengaged from the reaction element before the completion of the forward drive between the shafts.

18. In a transmission, the combination of a drive shaft, a driven shaft, gearing between said shafts and including a reaction element, a positive brake and a friction brake engageable with said reaction element for holding it stationary to complete a drive between said shafts, the reaction on said reaction element during said drive being such as to lock said positive brake in engagement with said reaction element, means movable to a brake engaging position to cause engagement of said friction brake and movable to a brake disengaging position to cause disengagement of said friction brake, and manually controlled means movable to a first position to cause engagement of said positive brake and movable to a second position to cause disengagement of said positive brake, said manually controlled means being connected with said first-named means and effective upon movement from its said first position towards its said second position to move said first-named means to its brake disengaging position to cause disengagement of said friction brake and to change the reaction on said reaction element and further effective upon movement to its said second position after the reaction on said reaction element has changed to disengage said positive brake.

19. In a transmission, the combination of a drive shaft, a driven shaft, gearing between said shafts and including a reaction element, a positive brake and a friction brake engageable with said reaction element for holding it stationary to complete a drive between said shafts, the reaction on said reaction element during said drive being such as to lock said positive brake in engagement with said reaction element, means movable to a brake engaging position to cause engagement of said friction brake and movable to a brake disengaging position to cause disengagement of said friction brake, and manually controlled means movable to a first position to cause engagement of said positive brake and movable to a second position to cause disengagement of said positive brake, said manually controlled means being connected to said positive brake by means of a link and a broken back lever and connected with the first-named means by means of the broken back lever and a second link, whereby an initial movement of the manually controlled means towards its second position breaks the broken back lever and moves the second link to cause movement of the first-named means to its said brake disengaging position thereby causing a disengagement of the friction brake and a change in the reaction on said reaction element and a subsequent complete movement of the manually controlled means to its second position after the change in the reaction on the reaction element straightens the broken back lever and disengages the positive brake.

20. In a transmission, the combination of a drive shaft, a driven shaft, a gear set drivingly connected between said shafts, an engaging device associated with said gear set and engageable to complete a drive from said drive shaft to said driven shaft through said gear set, said engaging device comprising a pair of elements which tend to become locked together during the establishment of said drive, another engaging device associated with said gear set and engageable to complete a different temporary drive through said gear set for facilitating unlocking of said elements, and means operating said other engaging device during the period of operation of said first-mentioned engaging device to thereby disestablish said first-mentioned drive.

References Cited in the file of this patent

UNITED STATES PATENTS

| | | |
|---|---|---|
| 2,144,795 | Cotterman | Jan. 24, 1939 |
| 2,300,036 | Peterson | Oct. 27, 1942 |
| 2,360,646 | Carnagua | Oct. 17, 1944 |
| 2,466,206 | Carnagua | Apr. 5, 1949 |
| 2,530,200 | Hobbs | Nov. 14, 1950 |
| 2,566,518 | Farkas | Sept. 4, 1951 |